P. A. PETERSON.
CRUMB PAN AND BRUSH.
APPLICATION FILED NOV. 13, 1919.
1,349,582.
Patented Aug. 17, 1920.
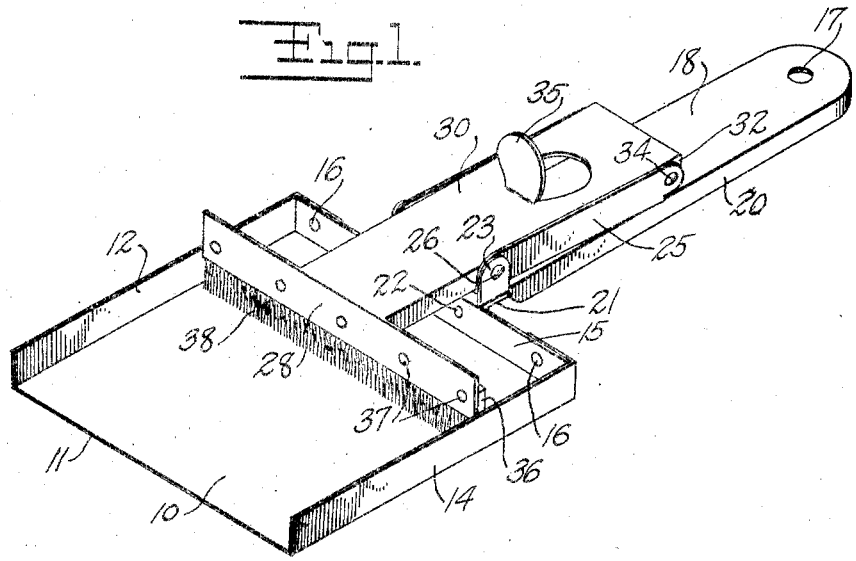
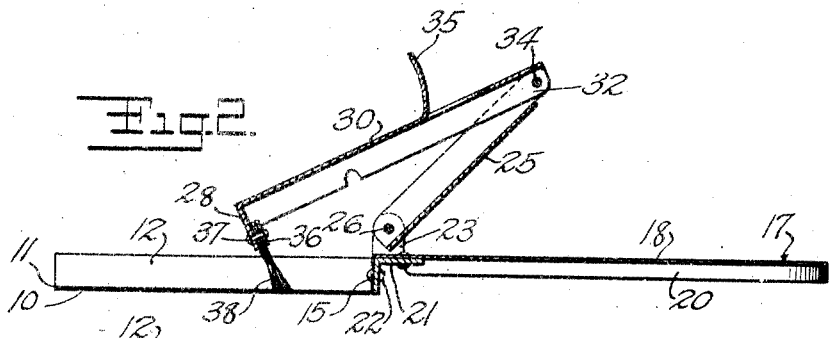
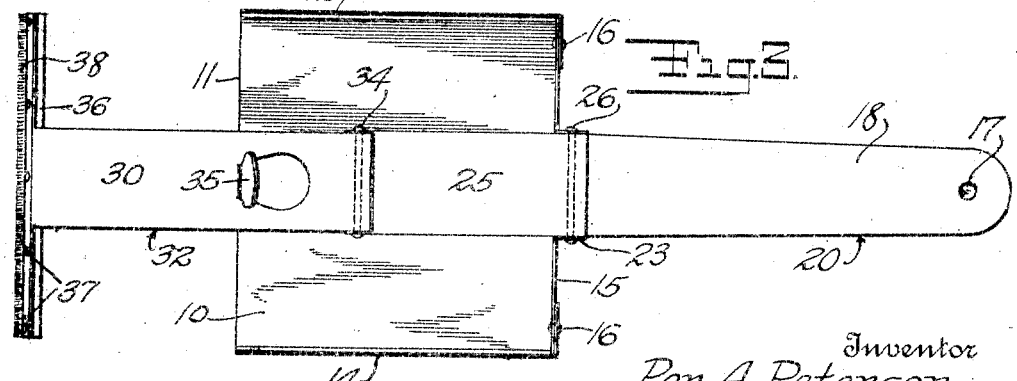
Inventor
Per A. Peterson
By his Attorney
Charles L. Wright

# UNITED STATES PATENT OFFICE.

PER A. PETERSON, OF NEW YORK, N. Y.

CRUMB PAN AND BRUSH.

1,349,582.  Specification of Letters Patent.  Patented Aug. 17, 1920.

Application filed November 13, 1919. Serial No. 337,640.

*To all whom it may concern:*

Be it known that I, PER A. PETERSON, a citizen of the United States, and a resident of the city of New York, county of New York, and State of New York, have invented certain new and useful Improvements in Crumb Pans and Brushes, of which the following is a specification.

The principal object of this invention is to provide a crumb pan comprised of a handled receptacle adapted to receive and hold the accumulations gathered and swept therein by the flexibly attached, manually operated brush.

Another object is in the provision made for permanently securing the brush to the pan by means of pivoted joints and a supplemental connecting frame.

These objects are attained by the novel construction and combination of parts hereinafter described and shown in the accompanying drawings, forming a material part of this disclosure and in which:—

Figure 1 is a perspective view showing the brush in a retracted position.

Fig. 2 is a longitudinal side view taken through the center of the same, and

Fig. 3 is a top plan view showing the brush in an extended position.

Referring to the drawing in detail, the numeral 10 designates the bottom of a shallow receptacle or pan having a slightly beveled front edge element 11 and provided with upturned side elements 12 and 14, bent angularly inward at their respective rear ends and secured to the upturned rear or back element 15 by the rivets 16.

A handle 18, formed integral with the pan and back extends outward in a line approximately parallel to the pan and is provided with down turned stiffening flanges 20.

In order to strengthen the handle, an angle 21 is secured to the handle 18 and pan back 15 respectively by rivets 22. A hole 17 is provided in the handle by which the device may be suspended from a hook or nail.

A pair of lugs 23 are formed integral with the handle 18, the same providing means for securing the trough shaped link 25 to the handle 18 by the rivet 26.

A brush frame 28, having a centrally extending arm 30, angularly bent with respect to the frame 28, is provided at the outer end with downturned lugs 32 pivotally engaged within the free outer end of the link 25 and secured thereto by the rivet 34. An operating hand grip 35 is formed integrally with the element 30 by slitting and bending to assist in the manipulation of the device.

An angularly bent clamp 36 attached to the frame 28 by the rivets 37 provides a means for securing the bristles 38 to brush frame 28. In operation, the front edge of the pan is placed on any level surface, close to the crumbs to be removed, one of the hands of the operator grasping the handle 18, while the fingers of the other hand manipulate the brush by the grip 35, in such manner as to raise and extend the brush in its outward movement and brush the crumbs upon the pan at its reverse or rearward movement in an obvious manner.

Having thus described my invention, what I claim as new and desire to secure by Letters Patent, is:—

1. In a device of the class described, the combination with a pan and a handle integral therewith, of a reinforcement engaging said pan and handle, a pair of spaced vertical lugs formed with said pan at the rear, a trough shaped link pivoted between said lugs, an arm pivoted to the free end of said link, a frame formed with said arm, said frame extending the full width of said pan, a brush carried at the lower edge of said frame, means for attaching said brush, and means formed with said arm for manipulating the brush.

2. In a device of the class described, the combination with a pan having raised rear and side edges, a handle extending from said rear edge in a plane parallel to said pan, facing lugs raised from the rear of said pan, a link pivoted in said lugs, a brush fitted to operate in said pan, a holder for said brush, an arm formed with said holder extending rearwardly at a right angle thereto, pivotal connections between the ends of said arm and said link, and means for manually operating said brush.

3. In a device of the class described, the combination with a rectangular pan having integral raised side and rear walls, a handle extending rearwardly from the upper edge of said rear wall in a plane parallel to said pan, reinforcing flanges formed with the lateral edges of said handle, a pair of lugs extending upwardly from said rear wall at the juncture of said handle, a link having flanged edges pivoted between the mentioned flanges, said link being substantially coincident in length with the length of said pan, a brush adapted to operate in said pan between the side walls thereof, a holder for said brush, an arm extending at a right angle to said holder, lugs at the end of said arm, pivotal connections between said lugs and the outer end of the mentioned flanges, and a raised element formed from said arm adapted for manual operation.

4. In a device of the class described, the combination with a rectangular pan having raised side and rear walls, and a handle extending rearwardly in a plane parallel to said pan, of a brush, and link connections between said handle and brush whereby the latter may be extended or retracted relative to said pan, said links being foldable closely over said handle and pan.

5. In a device of the class described, the combination with a rectangular pan having raised side and rear walls and a flat metallic handle having reinforced sides formed with and extending rearwardly from said pan, a brush, a holder therefor, an arm extending rearwardly at a right angle from said holder, means on said arm for maneuvering said brush, and a link connecting said arm and said handle, said link permitting the extension or retraction of said brush and preventing lateral movement thereof.

In testimony whereof I have signed my name to this specification.

PER A. PETERSON.